United States Patent
Chiba

(10) Patent No.: US 10,539,894 B2
(45) Date of Patent: Jan. 21, 2020

(54) TONER FOR DEVELOPING ELECTROSTATIC IMAGES

(71) Applicant: ZEON CORPORATION, Tokyo (JP)

(72) Inventor: Takeru Chiba, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/503,167

(22) PCT Filed: Aug. 5, 2015

(86) PCT No.: PCT/JP2015/072228
§ 371 (c)(1),
(2) Date: Feb. 10, 2017

(87) PCT Pub. No.: WO2016/027674
PCT Pub. Date: Feb. 25, 2016

(65) Prior Publication Data
US 2017/0227868 A1    Aug. 10, 2017

(30) Foreign Application Priority Data

Aug. 18, 2014  (JP) ................................ 2014-166143

(51) Int. Cl.
*G03G 9/097*    (2006.01)
*G03G 9/087*    (2006.01)
*C01B 33/148*   (2006.01)
*C01B 33/18*    (2006.01)
*G03G 9/09*     (2006.01)

(52) U.S. Cl.
CPC ........ *G03G 9/08711* (2013.01); *C01B 33/148* (2013.01); *C01B 33/18* (2013.01); *G03G 9/0904* (2013.01); *G03G 9/09725* (2013.01)

(58) Field of Classification Search
CPC ........... G03G 9/09708; G03G 9/09716; G03G 9/09725
See application file for complete search history.

(56) References Cited

U.S. PATENT DOCUMENTS

| | | | |
|---|---|---|---|
| 4,980,256 A | 12/1990 | Kato et al. | |
| 5,422,214 A | 6/1995 | Akiyama et al. | |
| 2006/0275680 A1* | 12/2006 | Miyakawa | G03G 9/09 430/45.51 |
| 2008/0069753 A1 | 3/2008 | Floess et al. | |
| 2008/0197283 A1* | 8/2008 | Veregin | G03G 9/0804 250/315.3 |
| 2012/0094230 A1 | 4/2012 | Sakoh | |
| 2014/0178813 A1* | 6/2014 | Okuno | C01B 13/145 430/111.1 |

FOREIGN PATENT DOCUMENTS

| | | | | |
|---|---|---|---|---|
| CN | 102369485 A | 3/2012 | | |
| JP | S63-294570 A | 12/1988 | | |
| JP | H02-55206 A | 2/1990 | | |
| JP | H05-224456 A | 9/1993 | | |
| JP | H06-332236 A | 12/1994 | | |
| JP | H07-64318 A | 3/1995 | | |
| JP | H09-34160 A | 2/1997 | | |
| JP | 10-123762 | * | 5/1998 | ............. G03G 9/097 |
| JP | H10-123762 A | 5/1998 | | |
| JP | 2007-108801 A | 4/2007 | | |
| JP | 2010-078893 A | 4/2010 | | |
| JP | 2010-128312 A | 6/2010 | | |
| JP | 2011-118210 A | 6/2011 | | |
| JP | 2013-139389 A | 7/2013 | | |

OTHER PUBLICATIONS

Translation of JP 10-123762 published May 1998.*
https://www.aerosil.com/sites/lists/RE/DocumentsSI/Technical-Overview-AEROSIL-Fumed-Silica-EN.pdf.*
International Preliminary Report on Patentability (PCT/IB/338) issued in PCT/JP2015/072228 with English translation.

* cited by examiner

*Primary Examiner* — Peter L Vajda
(74) *Attorney, Agent, or Firm* — Westerman, Hattori, Daniels & Adrian, LLP

(57) ABSTRACT

The present invention is to provide a toner for developing electrostatic images, which has an excellent balance between low-temperature fixability and heat-resistant shelf stability, which has good toner conveyance amount stability and printing durability, and which has less occurrence of fog in a high temperature and high humidity environment. Disclosed is a toner for developing electrostatic images, comprising colored resin particles containing a binder resin and a colorant, and an external additive, wherein the toner comprises, as the external additive, fine silica particles in an amount of 0.5 to 3.0 parts by mass with respect to 100 parts by mass of the colored resin particles, the fine silica particles having a hydrophobicity of 15 to 49% that is determined after a high-temperature and high-humidity incubation.

4 Claims, No Drawings

TONER FOR DEVELOPING ELECTROSTATIC IMAGES

TECHNICAL FIELD

The present invention relates to a toner for developing electrostatic images (hereinafter, simply referred to as "toner") which is used to, for example, develop an electrostatic latent image in electrophotography, electrostatic recording, or electrostatic printing. More particularly, the present invention relates to a toner for developing electrostatic images having excellent early-stage printing performance and printing durability performance.

BACKGROUND ART

In image forming devices such as an electrophotographic device, an electrostatic recording device and an electrostatic printing device, an image formation method in which an electrostatic latent image formed on a photo conductor is developed with a toner for developing electrostatic images to form a desired image, is widely carried out. This method is applied to a copier, a printer, a facsimile and composite machines thereof.

For example, in the electrophotographic device using electrophotography, in general, the surface of a photoconductor made of a photoconductive substance is uniformly charged by various means, and then an electrostatic latent image is formed on the photoconductor. Subsequently, the electrostatic latent image is developed with a toner, and the toner image is transferred onto a recording material such as a sheet of paper. The recording material is heated so as to fix the image, whereby a copy is obtained.

As for the toner used in an image forming device, in order to improve toner functions (e.g., charge stability and fluidity), external additives such as inorganic and organic particles having a particle diameter lower than that of colored resin particles (toner particles) are generally attached and added onto the surface of toner particles (external addition) and the resulting toner particles are used.

For the toner obtained by using the conventional external additive, it is sometimes hard to obtain a charge rising property at an early stage of printing. Particularly, the charge rising property is easily influenced at a time of use in a severe environment with a low temperature and a low humidity or with a high temperature and a high humidity. As a result, image quality deterioration due to fog is easily caused at the early stage of printing and leads to such a problem that there is an adverse effect on early-stage printing performance.

In the process of continuously printing a large number of sheets, due to mechanical stress in a development device (an increase in the number of times of contact between toner particles by stirring), such a defect that an external additive is buried in and/or liberated (detached) from the toner particle surfaces is easily caused and makes it difficult to impart a stable charging ability (charge stability) to the toner particles over time. As a result, during printing, a reduction in thin line reproducibility and a deterioration in image quality (such as fog) are caused and lead to such a problem that there is an adverse effect on printing durability performance.

Thus, there is a need for toner improvement so that excellent charge rising property is obtained at an early stage of printing even at a time of use in a severe environment; such a defect that the external additive is buried and/or liberated, is not caused even if, in the process of continuously printing a large number of sheets, there is an increase in the number of times of contact between toner particles by stirring in the development device; and the external additive is maintained in an appropriate attached state over time so that a stable charging ability (charge stability) can be imparted to the toner particles. In the case of having a stable charging ability, there is such an advantage that a change in toner conveyance property is small even during a durable printing process.

Patent Document 1 discloses a positively-chargeable toner comprising toner particles and, as external additives, a dry-type fine silica powder and a wet-type fine silica powder in order to provide a toner which allows image density to be stable over a long period of time so that no fog is caused even in the case of forming images at a low printing rate, wherein the dry-type fine silica powder has a positively charged polar group and a hydrophobic group, and the wet-type fine silica powder has a fluorine-containing negatively charged polar group and is surface-treated with a quaternary ammonium salt silane compound.

Patent Document 2 discloses a positively-chargeable toner for developing electrostatic images, comprising colored resin particles and an external additive in order to provide a toner which can impart a stable charging ability and fluidity to toner particles over time, which keeps thin line reproducibility even if a large number of sheets are continuously printed, and which hardly causes image quality deterioration due to fog even in a high temperature and high humidity environment, wherein the toner contains, as external additives, an external additive A in an amount of 0.01 to 0.5 part by weight with respect to 100 parts by weight of colored resin particles, the external additive A being fatty acid alkali metal salt particles or fatty acid alkaline earth metal salt particles having a number average primary particle diameter of 0.1 to 1 μm, and an external additive B in an amount of 0.2 to 2 parts by weight with respect to 100 parts by weight of the colored resin particles, the external additive B being fine spherical silica particles having a number average primary particle diameter of 40 to 200 nm and a sphericity of 1 to 1.3.

However, the toner disclosed in Patent Document 1 cannot strike a balance between toner conveyance amount stability in a normal temperature and normal humidity environment and fog characteristics in a high temperature and high humidity environment. On the other hand, while the toner disclosed in Patent Document 2 has excellent fog characteristics in a high humidity environment, it is insufficient in toner conveyance amount stability in a normal temperature and normal humidity environment.

CITATION LIST

Patent Document 1: Japanese Patent Application Laid-Open (JP-A) No. 2007-108801
Patent Document 2: JP-A No. 2010-128312

SUMMARY OF INVENTION

Technical Problem

An object of the present invention is to solve the above problems and to provide a toner for developing electrostatic images which has an excellent balance between low-temperature fixability and heat-resistant shelf stability, which has good toner conveyance amount stability and printing durability, and which has less occurrence of fog in a high temperature and high humidity environment.

Solution to Problem

The inventor of present invention examined the influence of the type of an external additive on toner conveyance amount stability and consequently found that the above problems can be solved by the use of a specific amount of such fine silica particles that the hydrophobicity determined after a high-temperature and high-humidity incubation is in a specific range.

That is, a toner for developing electrostatic images which is provided according to the present invention, comprises colored resin particles containing a binder resin and a colorant, and an external additive, wherein the toner comprises, as the external additive, fine silica particles in an amount of 0.5 to 3.0 parts by mass with respect to 100 parts by mass of the colored resin particles, the fine silica particles having a hydrophobicity of 15 to 49% that is determined after a high-temperature and high-humidity incubation.

In the present invention, it is preferable that a variation in hydrophobicity of the fine silica particles is 5 to 28% between a hydrophobicity determined before a high-temperature and high-humidity incubation and that determined after the high-temperature and high-humidity incubation.

In the present invention, it is preferable that the fine silica particles have a number average primary particle diameter of 50 to 500 nm.

In the present invention, it is preferable that the toner further comprises, as the external additive, fatty acid metal salt particles having a number average primary particle diameter of 100 to 2,000 nm.

In the present invention, it is preferable that a total content of the external additive is 1.40 to 4.00 parts by mass with respect to 100 parts by mass of the colored resin particles.

In the present invention, it is preferable that the colored resin particles are positively chargeable, and the fine silica particles are surface-treated to be positively chargeable.

Advantageous Effects of Invention

According to the present invention as described above, a specific amount of fine silica particles having a specific hydrophobicity that is determined after the high-temperature and high-humidity incubation are used, thereby obtaining a toner which has an excellent balance between low-temperature fixability and heat-resistant shelf stability, which has good toner conveyance amount stability and printing durability, and which has less occurrence of fog in a high temperature and high humidity environment.

DESCRIPTION OF EMBODIMENTS

The toner for developing electrostatic images according to the present invention comprises colored resin particles containing a binder resin and a colorant, and an external additive, wherein the toner comprises, as the external additive, fine silica particles in an amount of 0.5 to 3.0 parts by mass with respect to 100 parts by mass of the colored resin particles, the fine silica particles having a hydrophobicity of 15 to 49% that is determined after a high-temperature and high-humidity incubation.

Hereinafter, the toner of the present invention will be described.

The toner of the present invention comprises colored resin particles containing a binder resin and a colorant, and an external additive.

Hereinafter, a method for producing colored resin particles used in the present invention, the colored resin particles obtained by the production method, a method for producing a toner using the colored resin particles, and the toner of the present invention obtained by the production method, will be described in this order.

1. Method for Producing Colored Resin Particles

Generally, colored resin particle production methods are broadly classified into dry methods (such as a pulverization method) and wet methods (such as an emulsion polymerization agglomeration method, a suspension polymerization method and a solution suspension method). The wet methods are preferred since toners having excellent printing characteristics (such as image reproducibility) can be easily obtained. Among the wet methods, polymerization methods such as the emulsion polymerization agglomeration method and the suspension polymerization method are preferred since toners which have relatively small particle size distribution in micron order can be easily obtained. Among the polymerization methods, the suspension polymerization method is more preferred.

The emulsion polymerization agglomeration method is a method for producing colored resin particles by polymerizing emulsified polymerizable monomers to obtain a resin microparticle emulsion, and aggregating the resin microparticles with a colorant dispersion, etc. The solution suspension method is a method for producing colored resin particles by forming droplets of a solution in an aqueous medium, the solution containing toner components (such as a binder resin and a colorant) dissolved or dispersed in an organic solvent, and removing the organic solvent. Both methods can be carried out by known methods.

The colored resin particles of the present invention can be produced by employing any one of the wet methods and the dry methods. The suspension polymerization method, which is preferred among the wet methods, is employed and carried out by the following processes.

(A) Suspension Polymerization Method
(A-1) Preparation Process of Polymerizable Monomer Composition First, a polymerizable monomer, a colorant and other additives that are added as needed (such as a charge control agent) are mixed to prepare a polymerizable monomer composition. For example, a media type dispersing machine is used for the mixing to prepare the polymerizable monomer composition.

In the present invention, the polymerizable monomer means a monomer having a polymerizable functional group, and the polymerizable monomer is polymerizable to be a binder resin. It is preferable to use a monovinyl monomer as a main component of the polymerizable monomer. Examples of the monovinyl monomer include styrene; styrene derivatives such as vinyltoluene and α-methylstyrene; acrylic acid and methacrylic acid; acrylic acid esters such as methyl acrylate, ethyl acrylate, propyl acrylate, butyl acrylate, 2-ethylhexyl acrylate and dimethylaminoethyl acrylate; methacrylic acid esters such as methyl methacrylate, ethyl methacrylate, propyl methacrylate, butyl methacrylate, 2-ethylhexyl methacrylate and dimethylaminoethyl methacrylate; nitryl compounds such as acrylonitrile and methacrylonitrile; amide compounds such as acrylamide and methacrylamide; and olefins such as ethylene, propylene and butylene. These monovinyl monomers may be used alone or in combination of two or more kinds. Among them, styrene, the styrene derivatives, the acrylic acid esters or methacrylic acid esters are preferable as the monovinyl monomer.

In order to improve hot offset and shelf stability, it is preferable to use any crosslinkable polymerizable monomer together with the monovinyl monomer. The crosslinkable polymerizable monomer means a monomer having two or more polymerizable functional groups. Examples of the crosslinkable polymerizable monomer include, but are not limited to, aromatic divinyl compounds such as divinyl benzene, divinyl naphthalene and derivatives thereof; ester compounds such as ethylene glycol dimethacrylate and diethylene glycol dimethacrylate, in which two or more carboxylic acids having a carbon-carbon double bond are esterified to alcohol having two or more hydroxyl groups; other divinyl compounds such as N,N-divinylaniline and divinyl ether; and compounds having three or more vinyl groups. These crosslinkable polymerizable monomers can be used alone or in combination of two or more kinds.

In the present invention, it is desirable that the amount of the crosslinkable polymerizable monomer to be used is generally 0.1 to 5 parts by mass, preferably 0.3 to 2 parts by mass, with respect to 100 parts by mass of the monovinyl monomer.

Further, the use of a macromonomer as a part of the polymerizable monomer is preferred, since it provides the toner to be obtained with a good balance between shelf stability and low-temperature fixability. The macromonomer has a polymerizable carbon-carbon unsaturated double bond at the end of the molecular chain and is a reactive oligomer or polymer which usually has a number average molecular weight of 1,000 to 30,000. It is preferable that the macromonomer can form a polymer having a higher glass transition temperature (hereinafter sometimes referred to as "Tg") than a polymer obtained by polymerizing a monovinyl monomer. It is desirable that the used amount of the macromonomer is preferably from 0.03 to 5 parts by mass, more preferably 0.05 to 1 part by mass, with respect to 100 parts by mass of the monovinyl monomer.

In the present invention, a colorant is used. To produce a color toner, a black colorant, a cyan colorant, a yellow colorant and a magenta colorant can be used.

Examples of the black colorant include, but not limited to, carbon black, titanium black and magnetic powders such as zinc-iron oxide and nickel-iron oxide.

Examples of the cyan colorant include, but are not limited to, copper phthalocyanine compounds, derivatives thereof and anthraquinone compounds. The specific examples include, but are not limited to, C. I. Pigment Blue 2, 3, 6, 15, 15:1, 15:2, 15:3, 15:4, 16, 17:1 and 60.

Examples of the yellow colorant include, but are not limited to, compounds including azo pigments such as monoazo pigments and disazo pigments, and condensed polycyclic pigments. The specific examples include, but are not limited to, C. I. Pigment Yellow 3, 12, 13, 14, 15, 17, 62, 65, 73, 74, 83, 93, 97, 120, 138, 155, 180, 181, 185, 186 and 213.

Examples of the magenta colorant include, but are not limited to, compounds including azo pigments such as monoazo pigments and disazo pigments, and condensed polycyclic pigments. The specific examples include, but are not limited to, C. I. Pigment Red 31, 48, 57:1, 58, 60, 63, 64, 68, 81, 83, 87, 88, 83, 90, 112, 114, 122, 123, 144, 146, 149, 150, 163, 170, 184, 185, 187, 202, 206, 207, 209, 237, 238, 251, 254, 255 and 269 and C. I. Pigment Violet 19.

In the present invention, these colorants can be used alone or in combination of two or more kinds. The amount of the colorant is preferably 1 to 10 parts by mass, with respect to 100 parts by mass of the monovinyl monomer.

From the viewpoint of improving the releasing characteristics of the toner from a fixing roller at fixing, a release agent can be added to the polymerizable monomer composition as another additive. The release agent can be used without any particular limitation, as long as it is generally used as a release agent for a toner.

The release agent preferably contains at least one of an ester wax and a hydrocarbon wax. The use of these waxes as the release agent allows the balance between low-temperature finability and shelf stability to be improved.

The ester wax that is preferably used as the release agent in the present invention, is more preferably a polyfunctional ester wax. Examples thereof include, but are not limited to, pentaerythritol ester compounds such as pentaerythritol tetrapalmitate, pentaerythritol tetrabehenate, pentaerythritol tetrastearate; glycerin ester compounds such as hexaglycerin tetrabehenate tetrapalmitate, hexaglycerin octabehenate, pentaglycerin heptabehenate, tetraglycerin hexabehenate, triglycerin pentabehenate, diglycerin tetrabehenate and glycerintribehenate; and dipentaerythritol ester compounds such as dipentaerythritol hexamyristate and dipentaerythritol hexapalmitate. Among them, dipentaerythritol ester compounds are preferred. Dipentaerythritol hexamyristate is more preferred.

Examples of the hydrocarbon wax that is preferably used as the release agent in the present invention, include, but are not limited to, a polyethylene wax, a polypropylene wax, a Fischer-Tropsch wax, and a petroleum wax. Among them, a Fischer-Tropsch wax and a petroleum wax are preferred, and a petroleum wax is more preferred.

The number average molecular weight of the hydrocarbon wax is preferably 300 to 800, and more preferably 400 to 600. The penetration of the hydrocarbon wax measured in accordance with JIS K2235 5.4, is preferably 1 to 10, and more preferably 2 to 7.

In addition to the above release agents, natural waxes (such as jojoba wax) and mineral waxes (such as ozokerite) can be used.

As the release agent, these waxes can foe used alone or in combination of two or more kinds.

The amount of the release agent is preferably 0.1 to 30 parts by mass, and more preferably 1 to 20 parts by mass, with respect to 100 parts by mass of the monovinyl monomer.

In order to improve the charging ability of the toner, a positively- or negatively-chargeable charge control agent can be used as another additive.

The charge control agent is not particularly limited, as long as it is generally used as a charge control agent for a toner. Among charge control agents, a positively- or negatively-chargeable charge control resin is preferred, since the charge control resin is highly compatible with the polymerizable monomer and can impart stable charging ability (charge stability) to the toner particles. From the viewpoint of obtaining a positively-chargeable toner, the positively-chargeable charge control resin is more preferred.

Examples of the positively-chargeable charge control agent include, but are not limited to, a nigrosine dye; a quaternary ammonium salt; a triaminotriphenylmethane compound; an imidazole compound; and a polyamine resin, a copolymer having a quaternary ammonium group and a copolymer having a quaternary ammonium salt group, which are charge control resins preferably used.

Examples of the negatively-chargeable charge control agent include, but are not limited to, azo dyes containing metals such as Cr, Co, Al and Fe; salicylic acid metal compounds and alkyl salicylic acid metal compounds; and sulfonic acid group-containing copolymers, sulfonic acid salt group-containing copolymers, carboxylic acid group-containing copolymers and carboxylic acid salt group-containing copolymers, which are charge control resins preferably used.

In the present invention, it is desirable that the amount of the charge control agent is generally 0.01 to 10 parts by mass, and preferably 0.03 to 8 parts by mass, with respect to 100 parts by mass of the monovinyl monomer. If the added amount of the charge control agent is less than 0.01 parts by mass, fog may occur. On the other hand, if the added amount of the charge control agent is more than 10 parts by mass, printing soiling may occur.

As another additive, a molecular weight modifier is preferably used to polymerize the polymerizable monomer that is polymerizable to be a binder resin.

The molecular weight modifier is not particularly limited, as long as it is generally used as a molecular weight modifier for a toner. Examples of the molecular weight modifier include, but are not limited to, mercaptans such as t-dodecyl mercaptan, n-dodecyl mercaptan, n-octyl mercaptan and 2,2,4,6,6-pentamethylheptane-4-thiol, and thiuram disulfides such as tetramethyl thiuram disulfide, tetraethyl thiuram disulfide, tetrabutyl thiuram disulfide, N,N'-dimethyl-N,N'-diphenyl thiuram disulfide and N,N'-dioctadecyl-N,N'-diisopropyl thiuram disulfide. These molecular weight modifiers may be used alone or in combination of two or more kinds.

In the present invention, it is desirable that the amount of the molecular weight modifier is generally 0.01 to 10 parts by mass, and more preferably 0.1 to 5 parts by mass, with respect to 100 parts by mass of the monovinyl monomer.

(A-2) Suspension Process of Obtaining Suspension (Droplets Forming Process)

In the present invention, droplets of the polymerizable monomer composition are preferably formed as follows: the polymerizable monomer composition comprising at least a polymerizable monomer and a colorant is dispersed preferably in an aqueous medium containing a dispersion stabilizer; a polymerization initiator is added therein; and then the droplets of the polymerizable monomer composition are formed. The method for forming the droplets is not particularly limited. For example, the droplets are formed by means of a device capable of strong stirring, such as an in-line type emulsifying and dispersing machine (product name: Milder, manufactured by: Pacific Machinery & Engineering Co., Ltd.) or a high-speed emulsification dispersing machine (product name: T. K. Homomixer Mark II, manufactured by: PRIMIX Corporation).

Examples of the polymerization initiator include, but are not limited to, persulfates such as potassium persulfate and ammonium persulfate; azo compounds such as 4,4'-azobis (4-cyanovaleric acid), 2,2'-azobis(2-methyl-N-(2-hydroxyethyl)propionamide), 2,2'-azobis(2-amidinopropane)dihydrochloride, 2,2'-azobis(2,4-dimethylvaleronitrile) and 2,2'-azobisisobutyronitrile; and organic peroxides such as di-t-butylperoxide, benzoylperoxide, t-butylperoxy-2-ethylhexanoate, t-butylperoxydiethylacetate, t-hexylperoxy-2-ethylbutanoate, diisopropylperoxydicarbonate, di-t-butylperoxyisophthalate and t-butylperoxyisobutyrate. They can be used alone or in combination of two or more kinds. Among them, the organic peroxides are preferred since they can reduce a residual polymerizable monomer and can impart excellent printing durability.

Among the organic peroxides, peroxy esters are preferred and non-aromatic peroxy esters, i.e. peroxy esters having no aromatic ring, are more preferred since they have excellent initiator efficiency and can reduce a residual polymerizable monomer.

The polymerization initiator may be added after dispersing the polymerizable monomer composition in the aqueous medium and before forming the droplets, or it may be added to the polymerizable monomer composition before dispersing the polymerizable monomer composition in the aqueous medium.

The added amount of the polymerization initiator used for the polymerization of the polymerizable monomer composition, is preferably 0.1 to 20 parts by mass, more preferably 0.3 to 15 parts by mass, and still more preferably 1 to 10 parts by mass, with respect to 100 parts by mass of the monovinyl monomer.

In the present invention, the aqueous medium means a medium containing water as a main component.

In the present invention, the dispersion stabilizer is preferably added to the aqueous medium. Examples of the dispersion stabilizer include, but are not limited to inorganic compounds and organic compounds. Examples of the inorganic compounds include, but are not limited to, sulfates such as barium sulfate and calcium sulfate; carbonates such as barium carbonate, calcium carbonate and magnesium carbonate; phosphates such as calcium phosphate; metal oxides such as aluminum oxide and titanium oxide; and metal hydroxides such as aluminum hydroxide, magnesium hydroxide and iron(II) hydroxide. Examples of the organic compounds include, but are not limited to, water-soluble polymers such as polyvinyl alcohol, methyl cellulose and gelatin; anionic surfactants; nonionic surfactants; and ampholytic surfactants. These dispersion stabilizers can be used alone or in combination of two or more kinds.

Among the above dispersion stabilizers, a colloid of any one of the inorganic compounds, particularly a colloid of any one of the hardly water-soluble metal hydroxide, is preferred. By using the colloid of the inorganic compound, particularly the colloid of the hardly water-soluble metal hydroxide, the colored resin particles can have a small particle size distribution, and the amount of the dispersion stabilizer remaining after washing is small. Therefore, the toner thus obtained can clearly reproduce an image and obtain excellent environmental stability.

(A-3) Polymerization Process

After the droplets are formed as described in the above (A-2), an aqueous dispersion medium thus obtained is heated to start polymerization, whereby an aqueous dispersion of colored resin particles is formed.

The polymerization temperature of the polymerizable monomer composition is preferably 50° C. or more, and more preferably 60 to 95° C. The polymerization reaction time is preferably 1 to 20 hours, and more preferably 2 to 15 hours.

The colored resin particles may be mixed as they are with an external additive and used as a polymerized toner. Besides, the colored resin particles are preferably so-called core-shell type (or "capsule type") colored resin particles each of which is obtained by using each of the colored resin particles as a core layer and forming a shell layer, which is different from the core layer, around the core layer. By covering the core layer comprising a substance having a low softening point with a substance having a higher softening point, the core-shell type colored resin particles can take a balance of lowering fixing temperature and preventing aggregation during storage.

A method for producing the above-mentioned core-shell type colored resin particles using the colored resin particles, is not particularly limited, and the core-shell type colored resin particles can be produced by any conventional method. The in situ polymerization method and the phase separation method are preferred from the viewpoint of production efficiency.

A method for producing the core-shell type colored resin particles by the in situ polymerization method, will be hereinafter described.

A polymerizable monomer for forming a shell layer (a polymerizable monomer for shell) and a polymerization initiator are added to an aqueous medium in which the colored resin particles are dispersed, whereby polymerization is carried out. Therefore, the core-shell type colored resin particles can be obtained.

As the polymerizable monomer for shell, the above-mentioned polymerizable monomer can be similarly used. Among the polymerizable monomers, monomers which can provide a polymer having a glass transition temperature (Tg) of more than 80° C. (such as styrene, acrylonitrile and methyl methacrylate) are preferably used alone or in combination of two or more kinds.

Examples of the polymerization initiator used to polymerize the polymerizable monomer for shell include, but are not limited to, water-soluble polymerization initiators such as metal persulfates and azo type initiators. Examples of the metal persulfates include, but are not limited to, potassium persulfate and ammonium persulfate. Examples of the azo type initiators include, but are not limited to, 2,2'-azobis(2-methyl-N-(2-hydroxyethyl)propionamide) and 2,2'-azobis(2-methyl-N-(1,1-bis(hydroxymethyl)-2-hydroxyethyl)propionamide). These polymerization initiators can be used alone or in combination of two or more kinds. The amount of the polymerization initiator is preferably 0.1 to 30 parts by mass, and more preferably 1 to 20 parts by mass, with respect to 100 parts by mass of the polymerizable monomer for shell.

The polymerization temperature of the shell layer is preferably 50° C. or more, and more preferably 60 to 95° C. The polymerization reaction time is preferably 1 to 20 hours, and more preferably 2 to 15 hours.

(A-4) Processes of Washing, Filtering, Dehydrating and Drying

After the polymerization, it is preferable that the aqueous dispersion of the colored resin particles obtained by the polymerization, is subjected to a set of processes including filtering, washing for removing the dispersion stabilizer, dehydrating and drying, and that the set of processes is repeated several times as needed, in any conventional manner.

In the washing method, if the inorganic compound is used as the dispersion stabilizer, it is preferable that an acid or alkali is added to the aqueous dispersion of the colored resin particles, thereby dissolving the dispersion stabilizer in water for removal. If the colloid of the hardly water-soluble inorganic hydroxide is used as the dispersion stabilizer, it is preferable that an acid is added to the aqueous dispersion of the colored resin particles to control the pH of the aqueous dispersion to 6.5 or less. Examples of the acid include, but are not limited to, inorganic acids such as sulfuric acid, hydrochloric acid and nitric acid, and organic acids such as formic acid and acetic acid. Particularly, sulfuric acid is preferred for its high removal efficiency and small impact on production facilities.

The methods for dehydrating and filtering are not particularly limited, and any of various known methods can be used. For example, a centrifugal filtration method, a vacuum filtration method and a pressure filtration method can be used. Also, the drying method is not particularly limited, and any of various methods can be used.

(B) Pulverization Method

In the case of producing the colored resin particles by employing the pulverization method, the following processes are carried out.

First, a binder resin, a colorant, and other additives that are added as needed (such as a charge control agent) are mixed by means of a mixer such as a ball mill, a V type mixer, FM mixer (product name, manufactured by: Nippon Coke & Engineering. Co., Ltd.), a high-speed dissolver or an internal mixer. Next, the thus-obtained mixture is kneaded by means of a press kneader, a twin screw kneading machine or a roller, while heating the mixture. The thus-obtained kneaded product is coarsely pulverized by means of a pulverize (such as a hammer mill, a cutter mill or a roller mill), finely pulverized by means of a pulverizer (such as a jet mill or a high-speed rotary pulverizer) and then classified into desired particle diameters by means of a classifier (such as a wind classifier or an airflow classifier), thereby obtaining the colored resin particles produced by the pulverization method.

In the pulverization method, as the binder resin, the colorant and the other additives that are added as needed (such as a charge control agent), those that are provided in "(A) Suspension polymerization method" can be used. Similarly to the colored resin particles obtained by "(A) Suspension polymerization method", the colored resin particles obtained by the pulverization method can be in a form of core-shell type colored resin particles using the in situ polymerization method, etc.

As the binder resin, resins that are conventionally and widely used for toners can also be used. As the binder resin used in the pulverization method, examples include, but are not limited to, polystyrene, styrene-butyl acrylate copolymers, polyester resins and epoxy resins.

2. Colored Resin Particles

The colored resin particles are obtained by the above-mentioned suspension polymerization method (A) or pulverization method (B).

Hereinafter, the colored resin particles constituting the toner will be described. The colored resin particles hereinafter described include both core-shell type colored resin particles and colored resin particles that are not a core-shell type.

The volume average particle diameter (Dv) of the colored resin particles is preferably 4 to 12 μm, and more preferably 5 to 10 μm. If the volume average particle diameter (Dv) of the colored resin particles is less than 4 μm, the flowability of the toner may lower; therefore, the transferability of the toner may deteriorate, and the density of an image (image density) may decrease. If the volume average particle diameter (Dv) of the colored resin particles is more than 12 μm, the resolution of an image may decrease.

As for the colored resin particles, the ratio (Dv/Dn) of the volume average particle diameter (Dv) and the number average particle diameter (Dn) is preferably in a range of 1.00 to 1.20, and more preferably in a range of 1.00 to 1.15.

If "Dv/Dn" is more than 1.20, a decrease in transferability, image density and resolution may occur. The volume average particle diameter and number average particle diameter of the colored resin particles can be measured by means of a particle diameter measuring device (product name: Multisizer, manufactured by: Beckman Coulter, Inc.), for example.

3. Method for Producing the Toner of the Present Invention

The colored resin particles described above are mixed and agitated with an external additive, whereby the external additive is uniformly and suitably attached (externally added) on the surface of the colored resin particles. The one-component, toner may be a two-component toner by mixing and agitating the toner with carrier particles.

The agitator used to carry out the adding process is not particularly limited, as long as it is one that is capable of attaching the external additive on the surface of the colored resin particles. As the agitator, examples include, but are not limited to, agitators that are capable of mixing and agitating, such as FM Mixer (product name, manufactured by: Nippon Coke & Engineering Co., Ltd.), Super Mixer (product name, manufactured by: Kawata Manufacturing Co., Ltd.), Q Mixer (product name, manufactured by: Nippon Coke & Engineering Co., Ltd.), Mechanofusion system (product name, manufactured by: Hosokawa Micron Corporation) and Mechanomill (product name, manufactured by: Okada Seiko Co., Ltd.)

In the present invention, the toner comprises, as the external additive, fine silica particles in an amount of 0.5 to 3.0 parts by mass with respect to 100 parts by mass of the colored resin particles, the fine silica particles having a hydrophobicity of 15 to 49% that is determined after a high-temperature and high-humidity incubation.

In the present invention, the hydrophobicity of the fine silica particles that is determined after a high-temperature and high-humidity incubation, means a hydrophobicity that is determined after the fine silica particles are incubated in a predetermined temperature condition and a predetermined humidity condition for a sufficient time. The terms "a predetermined temperature condition" and "a predetermined humidity condition" used herein mean a temperature condition and a humidity condition in both of which the hydrophobicity of the surface of the fine silica particles starts to change. In the present invention, these terms mean a temperature of 50° C. and a relative humidity of 80%, respectively. Also, the term "a sufficient time" used herein means a sufficient time for the hydrophobicity having started to change in the predetermined temperature condition to reach a steady state. In the present invention it is 30 hours.

Even if the initial properties of the toner (e.g., low-temperature fixability and heat-resistant shelf stability) are good, the properties of the toner in use and those of the toner remaining in the development device after use are not necessarily the same level as the initial properties. This is because the printing condition of the toner (e.g., temperature and humidity) varies with season and weather, and the environment inside the development device where the used toner is left also differs from day to day. The toner is required to exert stable toner properties for a long time in any printing conditions and any environments where the toner is left. The hydrophobicity determined after the high-temperature and high-humidity incubation of the fine silica particles is one of the parameters for such a long-term stability of the toner.

The hydrophobicity of the fine silica particles varies with the method for producing the fine silica particles and the type and added amount of a surface treatment agent used. For some of the fine silica particles, the hydrophobicity changes depending on temperature and humidity. Especially in a high temperature and high humidity condition, a change in the chemical structure of the surface of the fine silica particles and a change in the properties of the surface treatment agent used readily occur; therefore, moisture may be adsorbed on the surface of the fine silica particles to lower the hydrophobicity thereof. The inventor of the present invention found that the toner which has an excellent balance between low-temperature fixability and heat-resistant shelf stability, which has good toner conveyance amount stability and printing durability, and which has less occurrence of fog in the high temperature and high humidity environment, can be obtained by use of the specific amount of the fine silica particles as the external additive, the fine silica particles having a hydrophobicity determined after a high-temperature and high-humidity incubation in a range of 15 to 49%. Based on this finding, the present invention was accomplished.

The hydrophobicity of fine silica particles determined after the high-temperature and high-humidity incubation, is measured by the following method. First, the fine silica particles are left in a normal temperature and normal humidity (N/N) environment (temperature: 23° C., humidity: 50%) for 30 hours. Then, the fine silica particles are incubated in an environment with a temperature of 50° C. and a relative humidity of 80% for 30 hours. Next, in a measurement temperature condition of 23° C., 1 g of the fine silica particle powder is floated on the surface of 100 mL of pure water. Then, methanol is gradually dropped to the water by means of a burette, while the water is gently stirred. Finally, the hydrophobicity determined after the high-temperature and high-humidity incubation is calculated by substituting the amount of the dropped methanol at the time when all the powder on the water surface sinks in the water, into the following equation:

Hydrophobicity determined after the high-temperature and high-humidity incubation (%)={Amount of dropped methanol [mL]/(100 [mL]+Amount of dropped methanol [mL])}×100

If the hydrophobicity determined after the high-temperature and high-humidity incubation is less than 15%, the fine silica particles readily absorb moisture; therefore, the toner may easily cause fog in a high temperature and a high humidity (H/H) condition. On the other hand, if the hydrophobicity determined after the high-temperature and high-humidity incubation is more than 49%, the hydrophobicity of the surface of the fine silica particles is too high. Therefore, the charge amount of the toner rapidly increases; the cohesion force between the toner particles increases; and the toner conveyance amount easily increases, whereby the toner conveyance amount stability deteriorates and results in poor printing durability.

The term "toner conveyance amount stability" used herein means such a toner characteristic that the amount of the toner conveyed from the development device (i.e., the toner conveyance amount) is stable over time. The toner may be aggregated over time; however, in contrast, the toner rarely refined over time. Therefore, in general, the toner conveyance amount increases as the toner characteristics change over time.

An example of the method for measuring the toner conveyance amount is as follows. First, after printing a predetermined number of sheets, white solid pattern is printed on a sheet using a printer, in a normal temperature and normal humidity (N/N) environment (for example, in an environment with a temperature of 23° C. and a humidity of 50%). Then, white solid pattern is printed on a second sheet and stopped in the middle. Thereafter, the toner attached on the developing roller of the printer is suctioned, and the mass of the suctioned toner and the suctioned area are measured by means of a suction-type charge amount measurement device (e.g., product name: 210HS-2A, manufactured by: TREK Japan KK). Based on the mass of the suctioned toner and the suctioned area, the toner conveyance amount (mg/cm$^2$) on the developing roller is calculated from the following calculation formulae 1 and 2:

Area (cm$^2$) on Developing Roller=
(Radius (cm) of Suction Trace)$^2$×
π×Number of Suction Traces     Calculation formula 1:

Toner Conveyance Amount (mg/cm$^2$) on Developing
Roller=Mass (mg) of Captured Toner/Area
(cm$^2$) on Developing roller     Calculation formula 2:

The toner conveyance amount stability is represented by a value obtained by dividing the toner conveyance amount after durable printing by a standard toner conveyance amount, as shown by the following calculation formula 3. The term "standard toner conveyance amount" used herein means a toner conveyance amount that is used as the criterion of stability, and it mainly means the toner conveyance amount at the early stage of the toner conveyance. The toner conveyance amount after durable printing means a toner conveyance amount after the completion of printing of a large number of sheets.

Toner Conveyance Amount Stability=Toner Convey-
ance Amount after Durable Printing/Standard
Toner Conveyance Amount     Calculation formula 3:

In general, the toner conveyance amount after durable printing is larger than or equal to the standard toner conveyance amount. Therefore, the toner conveyance amount stability is a value of 1 or more. As the value of the toner conveyance amount stability goes to 1, the toner conveyance amount is more difficult to change even after printing a large number of sheets, which means that the toner characteristic is stable over time. On the other hand, as the value of the toner conveyance amount stability increases, the toner conveyance amount increases too much after printing a large number of sheets, which means that the toner characteristic is instable over time. Thus, the toner conveyance amount stability can be one of the indicators of changes in toner characteristics over time.

The toner conveyance amount after durable printing can be classified into a toner conveyance amount just before the end of printing (end-stage toner conveyance amount) and a toner conveyance amount at the time of printing half of the predetermined number of sheets (middle-stage toner conveyance amount) for examination. When the toner conveyance amount at the early stage of the toner conveyance (early-stage toner conveyance amount) is defined as the standard toner conveyance amount, the toner conveyance amount stability (middle-stage) of the middle-stage toner conveyance amount and the toner conveyance amount stability (end-stage) of the end-stage toner conveyance amount are represented by the following calculation formulae 3a and 3b, respectively:

Toner conveyance amount stability (middle-stage)
=Middle-stage toner conveyance amount/Early-
stage toner conveyance amount     Calculation formula 3a:

Toner conveyance amount stability (end-stage)=End-
stage toner conveyance amount/Early-stage
toner conveyance amount     Calculation formula 3b:

As described above, since the toner conveyance amount increases over time, the toner conveyance amount usually increases in the following order: the end-stage toner conveyance amount, the middle-stage toner conveyance amount, the early-stage toner conveyance amount. Therefore, the value of the toner conveyance amount stability (end-stage) is generally higher than that of the toner conveyance amount stability (middle-stage).

The toner conveyance amount stability (middle-stage) can be an indicator of changes over time in toner characteristics in the middle stage of printing. Specifically, if the value of the toner conveyance amount stability (middle-stage) is 2.0 or more, the toner conveyance amount is twice or more than that of the early stage. Therefore, it is clear that in such an environment, the toner characteristics cannot be stably maintained, and it can be said that the printing can be stopped.

On the other hand, the toner conveyance amount stability (end-stage) is an indicator of changes over time in toner characteristics in the end stage of printing. Specifically, if the value of the toner conveyance amount stability (end-stage) is 2.5 or more, the toner conveyance amount is 2.5 times or more than that of the early stage. This shows that it is difficult to print more sheets.

As described above, the toner conveyance amount stability (middle-stage) and the toner conveyance amount stability (end-stage) are indicators that are closely associated with, in particular, the printing durability of the toner.

In the present invention, it is preferable that a variation in hydrophobicity of the fine silica particles is 5 to 28% between a hydrophobicity determined before a high-temperature and high-humidity incubation and that determined after the high-temperature and high-humidity incubation. The term "a variation in hydrophobicity between a hydrophobicity determined before a high-temperature; and high-humidity incubation and that determined after the high-temperature and high-humidity incubation" used herein means a difference between the hydrophobicity determined before the high-temperature and high-humidity incubation and the hydrophobicity determined after the high-temperature and high-humidity incubation. The hydrophobicity determined before the high-temperature and high-humidity incubation means a hydrophobicity obtained by measuring the fine silica particles that have been left in a normal temperature and normal humidity (N/N) environment (temperature: 23° C., humidity: 50%) for 30 hours, by the same measurement method as the method for measuring the hydrophobicity determined after the high-temperature and high-humidity incubation. As described above, the hydrophobicity of the fine silica particles generally decrease after the high-temperature and high-humidity incubation, so that the variation in hydrophobicity between the hydrophobicity determined before the high-temperature and high-humidity incubation and that determined after the high-temperature and high-humidity incubation, is a value obtained by subtracting the hydrophobicity determined after the high-temperature and high-humidity incubation from the hydrophobicity determined before the high-temperature and high-humidity incubation.

If the variation in hydrophobicity between the hydrophobicity determined before the high-temperature and high-humidity incubation and that determined after the high-temperature and high-humidity incubation is less than 5%, especially, the toner conveyance amount stability may be impaired and result in a deterioration in printing durability. If the variation is more than 28%, toner may easily cause fog in a high temperature and a high humidity environment.

The variation is more preferably 8 to 25%, and more preferably 10 to 20%. The reason why the variation affects printing performance is not clear; however, it is considered to be due to the influence of the chemical structure of the surface of the fine silica particles on printing performance.

As the fine silica particles used in the present invention, commercially available fine silica particles or fine silica particles prepared by any known production method can be used. As the known production method, examples include, but are not limited to, a method for producing fine silica particles from a silica-based particle dispersion.

As the method for producing fine silica particles from a silica-based particle dispersion, examples include, but are not limited to, the following methods (1) to (4).

(1) Fine silica particles can be produced as follows: an aqueous solution of alkali silicate (silica concentration: 3 to 10% by mass) selected from the group consisting of alkali metal silicate, tertiary ammonium silicate, quaternary ammonium silicate and guanidine silicate, is brought into contact with an H-type strong acid cation exchange resin to dealkalize the solution; as needed, the solution is brought into contact with an OH-type strong basic anion exchange resin to deanionize the solution, thereby preparing an active silica; an alkali substance is added to adjust the pH of the solution to 8 or more; the resulting mixture is heated to 50° C. or more to produce a silica sol; and the silica sol is dried to obtain fine silica particles.

(2) Fine silica particles can be produced as follows: conventionally known fine silica particles are dispersed in water to obtain a nuclear particle dispersion containing 0.005 to 20% by mass of $SiO_2$; as needed, an alkaline silicate other than potassium silicate (potassium water glass) and sodium silicate (sodium water glass) is added; an acidic silicate solution is added to grow nuclear particles, thereby producing a silica sol; and the silica sol is dried to obtain silica fine particles.

(3) Fine silica particles can be produced as follows: the above-described alkali silicate solution is neutralized with an acid to obtain a silica hydrogel; the silica hydrogel is washed to remove salts; an alkali is added and heated to a range of 60 to 200° C. to deflocculate the silica hydrogel, thereby producing a silica sol; and the silica sol is dried to obtain silica fine particles.

(4) Fine silica particles can be produced as follows: a silicon compound having a hydrolytic group (such as tetraethoxysilane) is added to a dispersion having nuclear particles; the resulting mixture is hydrolyzed to attach silica onto the nuclear particles for particle growth, thereby producing a silica sol; and the silica sol is dried to obtain fine silica particles.

It is also possible that the silica particle dispersion (silica sol) is adjusted at a solid content concentration of 10 to 25% by mass and then subjected to a hydrothermal treatment at a temperature of 130 to 300° C. for 3 to 20 hours. Since the hydrothermal treatment causes dissolution of the silica surface and precipitation of silicate oligomers on a convexo-concaved portion of the particle surface, the surface is modified and smoothed. In addition, the particles is made more spherical.

For adjusting the hydrophobicity determined after the high-temperature and high-humidity incubation, the fine silica particles are preferably surface-treated, and more preferably are surface-treated to be capable of imparting hydrophobicity. Particularly in the case of the positively-chargeable toner, it is more preferable that the colored resin particles show positive chargeablity and the fine silica particles are surface-treated to show positive chargeablity as well. To surface-treat the fine silica particles, a general hydrophobizing agent having no charging group may be used in combination to adjust hydrophobicity and/or positively charging ability. The surface of the fine silica particles is preferably hydrophobized with a silicon compound, and more preferably is hydrophoized with two or more kinds of silicon compounds. In the case of hydrophobizing the surface of the fine silica particles with two or more kinds of silicon compounds, in order to impart high positive chargeability, it is preferable that at least one of the two or more silicon compounds is a silicon compound containing an amino group, and the other silicon compounds are silicon compounds containing no amino group.

As the silicon compound containing an amino group, various types of amino group-containing silicon compounds may be used without particular restrictions. Examples include, but are not limited to, an amino group-containing silane coupling agent, an amino-modified silicone oil, a quaternary ammonium salt-based silane and a cyclic silazane. Among them, the amino group-containing silane coupling agent is particularly preferred from the viewpoint of positive charge imparting ability and fluidity. As the amino group-containing silane coupling agent, examples include, but are not limited to, N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane and N-phenyl-3-aminopropyltriethoxysilane. Among them, the amino alkyl group-containing coupling agent is preferred because it has an excellent effect of improving the environmental stability of charging performance.

From the viewpoint of adjusting the hydrophobicity determined after the high-temperature and high-humidity incubation within a range of 15 to 49%, the amino alkyl group-containing coupling agent is preferably in a range of 0.1 to 1.0% by mass, with respect to the fine silica particles.

As the silicon compounds containing no amino group, various types of silicon compounds containing no amino group may be used without particular restrictions, as long as they contain no amino group and have hydrophobicity. From the viewpoint of the environmental stability of the charging performance and the fluidity, for example, an alkoxysilane, a silane coupling agent, a silazane, a silicone oil and a silicone resin are preferred, and the alkoxysilane, silicone oil, and silicone resin are particularly preferred. As the alkoxysilane, examples include, but are not limited to, isobutyltrimethoxysilane, octyltriethoxysilane and trifluoropropyltrimetoxysilane. As the silazane, examples include, but are not limited to, hexamethyldisilazane. As the silicone oil, examples include, but are not limited to, straight silicone oils such as dimethylpolysiloxane and methylhydrogenpolysiloxane, and modified silicone oils such as an epoxy-modified silicone oil and a fluorine-modified silicone oil. As the silicone resin, examples include, but are not limited to, trimethylsiloxysilicic acid.

From the viewpoint of adjusting the hydrophobicity determined after the high-temperature and high-humidity incubation within a range of 15 to 49%, it is preferable to use silazane in a range of 4.0 to 5.0% by mass, with respect to the fine silica particles.

The content of the fine silica particles is generally 0.5 to 3.0 parts by mass, preferably 0.7 to 2.5 parts by mass, and more preferably 1.0 to 2.0 parts by mass, with respect to 100 parts by mass of the colored resin particles.

If the content of the fine silica particles is less than 0.5 part by mass, they cannot sufficiently function as the external additive and may have adverse effects on the printing performance of the toner, especially on heat-resistant shelf stability, printing durability, and toner conveyance amount stability. On the other hand, if the content of the fine silica particles is more than 3.0 parts by mass, the fine silica particles are easily liberated from the surface of the toner particles, and the liberated external additive is attached to members in the development device and may have adverse effects on the printing performance of the toner, especially on heat-resistant shelf stability, printing durability, and toner conveyance amount stability. Also, fog easily occurs in a high temperature and a high humidity environment.

The fine silica particles preferably have a number average primary particle diameter of 50 to 500 nm. If the number average primary particle diameter of the fine silica particles is less than 50 nm, the spacer effect of the fine silica particles is reduced to make fine silica particles B and so on, which will be described below, easy to be buried from the surface of the colored resin particles to the inside. Accordingly, there may be adverse effects on the printing performance, such as the occurrence of fog. On the other hand, if the number average primary particle diameter of the fine silica particles is more than 500 nm, the fine silica particles are easily liberated from the surface of the toner particles to reduce the function as the external additive. Accordingly, there may be adverse effects on the printing performance.

The fine silica particles preferably have a number average primary particle diameter of 70 to 400 nm, and more preferably 100 to 300 nm.

In the present invention, it is preferable that fatty acid metal salt particles having a number average primary particle diameter of 100 to 2,000 nm are further contained as the external additive. If the number average primary particle diameter of the fatty acid metal salt particles is less than 100 nm, the charging ability of the toner decreases and fog may occur. On the other hand, if the number average primary particle diameter of the fatty acid metal salt particles is more than 2,000 nm, white spots may be generated on a printed image.

The fatty acid metal salt particles have preferably a number average primary particle diameter of 500 to 1,500 nm, and more preferably 800 to 1,000 nm.

Examples of the metal constituting the fatty acid metal salt include, but are not limited to, Li, Na, K, Rb, Cs, Be, Mg, Ca, Sr, Ba and Zn.

The fatty acid (R—COOH) which corresponds to the fatty acid site (R—COO$^-$) of the fatty acid metal salt encompasses, of carboxylic acids (R—COOH) having a carboxyl group (—COOH), all carboxylic acids having a chain structure. In the present invention, the fatty acid site is preferably one derived from a higher fatty acid in which the alkyl group (R—) has a large number of carbons.

As the higher fatty acid (R—COOH), examples include, but are not limited to, lauric acid ($CH_3(CH_2)_{10}COOH$), tridecane acid ($CH_3(CH_2)_{11}COOH$), myristic acid ($CH_3(CH_2)_{12}COOH$), pentadecanoic acid ($CH_3(CH_2)_{13}COOH$), palmitic acid ($CH_3(CH_2)_{14}COOH$), heptadecanoic acid ($CH_3(CH_2)_{15}COOH$), stearic acid ($CH_3(CH_2)_{16}COOH$), arachidic acid ($CH_3(CH_2)_{18}COOH$), behenic acid ($CH_3(CH_2)_{20}COOH$) and lignoceric acid ($CH_3(CH_2)_{22}COOH$).

In particular, as the fatty acid metal salt, examples include, but are not limited to, metal laurates such as lithium laurate, sodium laurate, potassium laurate, magnesium laurate, calcium laurate and barium laurate; metal myristates such as lithium myristate, sodium myristate, potassium myristate, magnesium myristate, calcium myristate and barium myristate; metal palmitates such as lithium palmitate, sodium palmitate, potassium palmitate, magnesium, palmitate, calcium palmitate and barium palmitate; and metal stearates such as lithium stearate, sodium stearate, potassium stearate, magnesium stearate, calcium stearate, barium stearate and zinc stearate. Among them, the metal stearates are preferred, and zinc stearate is more preferred.

The amount of the fatty acid metal salt particles that is suitably used as the external additives in the present invention, is preferably 0.01 to 1 part by mass, and more preferably 0.03 to 0.3 part by mass, with respect to 100 parts by mass of the colored resin particles.

As the fatty acid metal salt particles, various types of commercial products may be used. Examples thereof include, but are not limited to, the following products manufactured by Sakai Chemical Industry Co., Ltd.: SPL-100F (product name, lithium stearate, number average primary particle diameter: 0.71 μm), SPX-100F (product name, magnesium stearate, number average primary particle diameter: 0.72 μm), SPC-100F (product name, calcium stearate, number average primary particle diameter: 0.51 μm), and SPZ-100F (product name, zinc stearate, number average primary particle diameter: 0.5 μm).

In the present invention, it is preferable that fine silica particles having a number average primary particle diameter of 7 to 49 nm (hereinafter referred to as "fine silica particles B") are further contained as the external additive.

If the number average primary particle diameter of the fine silica particles B is less than 7 nm, the fine silica particles B are easily buried from the surface of the colored resin particles to the inside. In the case of printing a large number of sheets, sufficient fluidity cannot be imparted to the toner particles, and there are adverse effects on the printing performance. On the other hand, if the number average primary particle diameter of the fine silica particles B is more than 49 nm, the proportion of fine silica particles B to the toner particle surface (coverage) is reduced. Thus, sufficient fluidity cannot be imparted to the toner particles.

The fine silica particles B preferably have a number average primary particle diameter of 10 to 40 nm, and more preferably 12 to 30 nm.

The content of the fine silica particles B is generally from 0.1 to 2.0 parts by mass, preferably 0.3 to 1.2 parts by mass, and more preferably 0.4 to 0.8 part by mass, with respect to 100 parts by mass of the colored resin particles.

If the content of the fine silica particles B is less than 0.1 part by mass, they cannot sufficiently function as the external additive and may reduce fluidity or shelf stability. On the other hand, if the content of the fine silica particles B is more than 2.0 parts by mass, the fine silica particles B are easily liberated from the surface of toner particles. Therefore, the charging ability in a high temperature and high humidity environment decreases, and fog occurs.

The fine silica particles B are preferably surface-treated, and more preferably surface-treated with a hydrophobizing agent having a positively chargeable functional group. The details of the surface treatment of fine silica particles B are the same as the above-described surface treatment of the fine silica particles.

As the fine silica particles B, various types of commercially available products can be used. Examples thereof include, but are not limited to, HDK2150 (product name, number average primary particle diameter: 12 nm) manufactured by Clariant; RX50 (product name, number average primary particle diameter: 40 nm), NA50Y (product name, number average primary particle diameter: 35 nm), NA130Y (product name, number average primary particle diameter: 20 nm), R504 (product name, number average primary particle diameter: 12 nm), RX200 (product name, number average primary particle diameter: 12 nm) and RY300 (product name, number average primary particle diameter: 7 nm), all of which are manufactured by Nippon Aerosil Co., Ltd.; MSP-012 (product name, number average primary particle diameter: 16 nm) and MSN-004 (product name, number average primary particle diameter: 16 nm), both of which are manufactured by TAYCA; and TG-7120 (product name, number average primary particle diameter: 20 nm) and TG820F (product name, number average primary particle diameter: 7 nm), both of which are manufactured by Cabot.

In the present invention, the total content of the external additive is preferably 1.40 to 4.00 parts by mass with respect to 100 parts by mass of the colored resin particles. If the total content of the external additive is less than 1.40 parts by mass, the toner may not be absolutely transferred and may remain. If the total content of the external additive is more than 4.00 parts by mass, fog may occur.

The total content of the external additive is preferably 1.70 to 3.50 parts by mass, and more preferably 2.00 to 3.00 parts by mass, with respect to 100 parts by mass of the colored resin particles.

EXAMPLES

Hereinafter, the present invention will be described further in detail, with reference to examples and comparative examples. The scope of the present invention may not be limited to the following examples. Herein, "part (s)" and "%" are based on mass if not particularly mentioned.

Test methods used in the examples and the comparative examples are as follows.

1. Production of Fine Silica Particles

Production Example 1

1-1. Preparation of Silicic Acid Solution

First, 14,000 g of sodium silicate (No. 3 water glass) at a concentration of 4.7% was passed through an ultra filtration module (product name: SIP-1013, manufactured by: Asahi Kasei Corporation). Filtered water was recovered to obtain purified water glass. Pure water was added to the purified water glass so that the purified water glass was at a silica concentration of 5%. Then, 13,000 g of water glass at a silica concentration of 5% was passed through 2.2 L of a strong acid cation exchange resin (product name: SK1BH, manufactured by: Mitsubishi Chemical Corporation) at a space velocity of 3.1, thereby obtaining 13,300 g of a silicic acid solution. The silica concentration of the silicic acid solution was 4.7%.

1-2. Preparation of Fine Silica Particle Dispersion as Starting Material (Silica Sol)

To 67.2 g of sodium silicate (No. 3 water glass, SiO$_2$ concentration: 24.68%), 839.5 g of pure water was added to prepare diluted water glass at a silica concentration of 1.8%. Next, 6.3 g of the silicic acid solution at a silica concentration of 4.7% was added to the diluted water glass and stirred. Then, the temperature of the mixture was raised to 79° C. The mixture was kept at 79° C. for 30 minutes, and 6162.9 g of the silicic acid solution at a silica concentration of 4.7% was further added thereto for 22 hours. After the addition was completed, the mixture was kept at 79° C. for 1 hour and then cooled to room temperature to obtain a silica sol. The silica sol was concentrated using an ultrafiltration membrane (product name: SIP-1013, manufactured by: Asahi Kasei Corporation) until the silica concentration reached 12%. Then, the silica sol was concentrated to 20% by a rotary evaporator.

1-3. Preparation of Fine Silica Particles

First, 100 of the particles of thus-obtained the silica sol (Z10) was observed by SEM observation. As a result, it was found that the silica sol is one having an average particle diameter of 100 nm (silica sol a).

The silica sol a was passed through a cation exchange resin in the same manner as the preparation of the silicic acid solution, followed by drying, thereby obtaining fine silica particles a.

The fine silica particles a were put in a container. After adding a small amount of water, the container was hermetically sealed and incubated at 50° C. for 20 hours. Next, after cooling the container, 4.6% of hexamethyldisilazane as a hydrophobizing agent and 0.4% of 3-aminopropyltriethoxysilane as a positively chargeable agent, were added to the container at a room temperature, and then the container was incubated at 50° C. for 48 hours. Thereafter, the container was opened, and the particles were dried at 100° C. for 16 hours, thereby obtaining fine silica particles 1 which have an average particle diameter of 100 nm, a hydrophobicity of 48% that was determined before the high-temperature and high-humidity incubation, and a hydrophobicity of 35% that was determined after the high-temperature and high-humidity incubation (a variation in hydrophobicity: 13%).

Production Examples 2 to 7

Fine silica particles 2 to 5 and 7 were produced in the same manner as in Production example 1, except that the added amounts of hexamethyldisilazane and 3-aminopropyltriethoxysilane were changed as shown in Table 1. Fine silica particles 6 were obtained in the same manner as in Production example 1, except that the added amount of hexamethyldisilazane was changed as shown in Table 1, and 0.4% of 3-aminopropyltriethoxysilane was changed to 0.5% of 3-aminopropyltrimethoxysilane.

2. Evaluation of Physical Properties of Fine Silica Particles

The physical properties of the fine silica particles 1 to 7 and HDKH05TA (product name; manufactured by: Wacker Chemie AG; hereinafter, it may be referred to as "fine silica particles 8" were examined. The details are as follows. The evaluation results are shown in Table 1.

2-1. Measurement of Hydrophobicity Determined Before High-temperature and High-humidity Incubation First, the fine silica particles were left in an environment with a temperature of 23° C. and a relative humidity of 50% for 30 hours. Next, in a measurement temperature condition of 23° C., 1 g of the fine silica particle powder was floated on the surface of 100 mL of pure water. Then, methanol was gradually dropped to the water by means of a burette, while the water was gently stirred. Finally, the hydrophobicity determined before the high-temperature and high-humidity incubation was calculated by substituting the amount of the dropped methanol at the time when all the powder on the water surface sank in the water, into the following equation:

Hydrophobicity determined before the high-temperature and high-humidity incubation (%)={Amount of dropped methanol [mL]/(100 [mL]+Amount of dropped methanol [mL])}×100

2-2. Measurement of Hydrophobicity Determined After the High-temperature and High-humidity Incubation First, the fine silica particles were left in an environment with a temperature of 23° C. and a relative humidity of 50% for 30 hours. Then, the fine silica particles were incubated in an environment with a temperature of 50° C. and a relative humidity of 80% for 30 hours.

Thereafter, titration was carried out in the same manner as in the above-described method for measuring the hydrophobicity, and the hydrophobicity determined after the high-temperature and high-humidity incubation was calculated.

The following Table 1 shows the details of the fine silica particles 1 to 8, the added amounts of the surface treatment agents (i.e., the hydrophobizing agent and the positively chargeable agent) and the hydrophobicities of the fine silica particles. The term "HMDS" in Table 1 means hexamethyldisilazane.

polymerization initiator (product name: Trigonox, manufactured by: NOF Corporation) was added therein, and the mixture was dispersed by high-speed shear agitation at 15,000 rpm for 10 minutes using an in-line type emulsifying and dispersing machine (product name: Milder MDN303V, manufactured by: Pacific Machinery & Engineering Co., Ltd.) Thus, the polymerizable monomer composition was formed into droplets.

The suspension in which the droplets of the polymerizable monomer composition were dispersed (a polymerizable monomer composition dispersion) was put in a reactor furnished with an agitating blade, and the temperature

TABLE 1

|   | HMDS (%) | 3-Aminopropyl-triethoxysilane (%) | 3-Aminopropyl-trimethoxysilane (%) | Hydrophobicity determined before the high-temperature and high-humidity incubation (%) | Hydrophobicity determined after the high-temperature and high-humidity incubation (%) | Variation in hydrophobicity (%) |
|---|---|---|---|---|---|---|
| Fine silica particles 1 | 4.6 | 0.4 | — | 48 | 35 | 13 |
| Fine silica particles 2 | 4.7 | 0.3 | — | 52 | 43 | 9 |
| Fine silica particles 3 | 4.4 | 0.6 | — | 49 | 27 | 22 |
| Fine silica particles 4 | 4.9 | 0.1 | — | 55 | 48 | 7 |
| Fine silica particles 5 | 4.0 | 1.0 | — | 46 | 17 | 29 |
| Fine silica particles 6 | 4.0 | — | 0.5 | 51 | 51 | 0 |
| Fine silica particles 7 | 2.5 | 1.5 | — | 44 | 10 | 34 |
| Fine silica particles 8 | — | — | — | 67 | 66 | 1 |

3. Production of Toner

Example 1

First, 75 parts of styrene and 25 parts of n-butyl acrylate as polymerizable monomers and 7 parts of carbon black (product name: #25B, manufactured by: Mitsubishi Chemical Corporation) as a black colorant, were dispersed by means of a disperser (product name: DYNO-MILL, manufactured by: Shinmaru Enterprises Corporation) to obtain a polymerizable monomer mixture.

To the polymerizable monomer mixture, 2.8 parts of a charge control resin (a styrene acrylic resin having a quaternary ammonium group) as a charge control agent, 5 parts of a fatty acid ester wax as a release agent, 5 parts of a paraffin wax, 0.3 part of a polymethacrylic acid ester macromonomer (product name: AA6, manufactured by: Toagosei Co., Ltd.) as a macromonomer, 0.6 part of divinylbenzene as a crosslinkable polymerizable monomer, and 1.5 parts of t-dodecyl mercaptan as a molecular weight modifier, were added. They were mixed and dissolved to prepare a polymerizable monomer composition.

Also, an aqueous solution of 6.2 parts of sodium hydroxide (alkali metal hydroxide) dissolved in 50 parts of ion-exchanged water, was gradually added to an aqueous solution of 10.2 parts of magnesium chloride (water-soluble polyvalent metal salt) dissolved in 250 parts of ion-exchanged water, while stirring the latter at room temperature, thereby preparing a magnesium hydroxide colloid (hardly water-soluble metal hydroxide colloid) dispersion.

The polymerizable monomer composition was put in the magnesium hydroxide colloid dispersion at room temperature, and the mixture was stirred. Then, 4.4 parts of a thereof was raised to 90° C. to start a polymerization reaction. When the polymerization conversion rate reached almost 100%, 1 part of methyl methacrylate as a polymerizable monomer for shell and 0.3 part of 2,2'-azobis (2-methyl-N-(2-hydroxyethyl)-propionamide) (product name: VA-086, manufactured by: Wako Pure Chemical Industries, Ltd.; water-soluble) as a polymerization initiator for shell, which was dissolved in 10 parts of ion-exchanged water, were added into the reactor, and the reaction was continued for 4 hours at 90° C. Then, the reactor was water-cooled to stop the reaction. Thus, an aqueous dispersion of colored resin particles having a core-shell structure was obtained.

With agitating the aqueous dispersion of the colored resin particles at room temperature, sulfuric acid was added dropwise to the aqueous dispersion for acid washing, until the pH of the aqueous dispersion reached 6.5 or less. Then, separation by filtration was carried out thereon to obtain a solid content. Next, the solid content was reslurried with 500 parts of ion-exchanged water and subjected to a water washing treatment (washing, filtration and dehydration) several times. Next, filtration separation was carried out thereon to obtain a solid content, and the solid content was placed in the container of a dryer and dried at 40° C. for 24 hours, thereby obtaining dried colored resin particles.

To 100 parts of the colored resin particles, 1.5 parts of the fine silica particles 1 as an external additive A, 0.7 part of fine silica particles b having a number average primary particle diameter of 20 nm (product name: TG-7120, manufactured by: Cabot) as an external additive B, 0.1 part of zinc stearate particles c having a number average primary particle diameter of 500 nm (product name: SPZ-100F, manufactured by Sakai Chemical Industry Co., Ltd.) as an external additive C, were added. An external addition treatment was carried out thereon by mixing and agitating them with a 10 L laboratory-scale high speed agitator furnished with a cooling jacket (product name: FM mixer, manufactured by: Nippon Coke & Engineering. Co., Ltd.) in such a condition that the agitating blade is at a rim speed of 40 m/sec and the external addition treatment time is 300 seconds. Therefore, the toner of Example 1 was produced. The test results of Example 1 are shown in Table 2.

Examples 2 to 8 and Comparative Examples 1 to 5

The toners of Examples 2 to 8 and Comparative Examples 1 to 5 were produced in the same manner as in Example 1, except that the external additive used in Example 1 was changed as shown in Table 2.

4. Evaluation of Characteristics of Colored Resin Particles and Toners

The characteristics of the toners of Examples 1 to 8 and Comparative Examples 1 to 5, and the characteristics of the colored resin particles used for the toners, were examined. The details are as follows. Their evaluation results are shown in Table 2.

(1) Measurement of Particle Diameter of Colored Resin Particles

The volume average particle diameter (Dv), number average particle diameter (Dn), and particle size distribution (Dv/Dn) of the colored resin particles were examined.

About 0.1 g of the measurement sample (colored resin particles) was weighed and put in a beaker. Next, 0.1 mL of an alkylbenzene sulfonic acid aqueous solution (product name: Driwel, manufactured by: Fujifilm Corporation) as a dispersant was added thereto. In addition, 10 to 30 mL of Isoton II was put in the beaker. The mixture was dispersed for 3 minutes with a 20 W (watt) ultrasonic disperser. Then, the volume average particle diameter (Dv) and number average particle diameter (Dn) of the colored resin particles were measured with a particle diameter measuring device (product name: Multisizer, manufactured by: Beckman Coulter, Inc.) in the following condition. Also, the particle size distribution (Dv/Dn) was calculated.

Aperture diameter: 100 μm
Medium: Isoton II
Number of measured particles: 100,000 particles The obtained colored resin particles have a volume average particle diameter (Dv) of 7.8 μm, a number average particle diameter (Dn) of 6.9 μm, and a particle size distribution (Dv/Dn) of 1.13.

(2) Average Circularity

The average circularity of the obtained colored resin particles was examined.

First, 10 mL of ion-exchanged water was put in a container. Then, 0.02 g of a surfactant (alkylbenzene sulfonic acid) as a dispersant was added thereto. In addition, 0.02 g of the measurement sample (colored resin particles) was added thereto, and a dispersion treatment was carried out thereon for 3 minutes with an ultrasonic disperser at 60 W (watt). The resultant was adjusted so as to have a colored resin particle concentration of 3,000 to 10,000 particles/μL at the time of measurement. Of the colored resin particles, 1,000 to 10,000 particles having an equivalent circle diameter of 0.4 μm or more were measured with a flow particle image analyzer (product name: FPIA-2100, manufactured by: Sysmex Corporation). From the measured values, the average circularity was obtained.

The circularity is represented by the following calculation formula 4. The average circularity is the average of the calculated circularity values.

(Circularity)=(Perimeter of a Circle Having the Same Area as the Projected Area of a Particle Image)/(Perimeter of the Projected Particle Image)     Calculation Formula 4:

The average circularity of the obtained colored resin particles was 0.988.

(3) Minimum Fixing Temperature

A toner fixing test was carried out with the use of a commercially available, non-magnetic one-component development printer modified to be able to change the temperature of its fixing roller. In the toner fixing test, a black solid pattern (100% image density) was printed; the temperature of the fixing roller in the modified printer was changed by 5° C.; and a toner fixing rate was measured at each temperature to determine the relationship between the temperature and the toner fixing rate. For calculation of the toner fixing rate, a piece of tape attached to the black solid pattern (100% image density) printed area was peeled off, and the toner fixing rate was calculated from the ratio of image densities before and after the peeling off of the piece of tape. Specifically, if the image density before the peeling off the piece of tape is referred to as "ID (before)" and the image density after the peeling off of the piece of tape is referred to as "ID (after)", the toner fixing rate can be calculated by the following calculation formula 5:

Toner Fixing Rate (%)= (ID (after)/ID (before))×100     Calculation formula 5:

The operation of peeling off the piece of tape is a set of processes including: attaching a piece of an adhesive tape (product name: SCOTCH Mending Tape 810-3-18, manufactured by: Sumitomo 3M Limited) to an area to be measured on a test sheet; sticking the piece of the adhesive tape to the area by pressing at a constant pressure; and peeling off the piece of adhesive tape in a direction along the sheet at a constant rate. The image density was measured by means of a reflection densitometer (product name: RD914, manufactured by: Macbeth). In the toner fixing test, the minimum temperature of the fixing roller at which the toner fixing rate is more than 80%, was determined as the minimum toner fixing temperature.

(4) Shelf Stability

First, 10 g of the toner was placed in a hermetically-sealable polyethylene container (volume 100 mL). The container was hermetically sealed, retained in a constant temperature water bath at a temperature of 55° C., left for 8 hours, and then taken out from the constant temperature water bath. The toner was taken out from the container and placed on a 42-mesh sieve. At this time, the toner was gently taken out from the container and carefully placed on the sieve so that the aggregation structure of the toner was not damaged in the container. The sieve on which the toner was placed was vibrated for 30 seconds at an amplitude of 1 mm, by means of a powder characteristic tester (product name: Powder Tester PT-R, manufactured by: Hosokawa Micron Corporation). Thereafter, the mass of the toner remained on the sieve was measured and determined as an aggregated toner mass. The measurement was carried out 3 times per sample, and the average of the measured values was determined as the indicator of shelf stability.

5. Evaluation of Printing Characteristics of Toner

The printing characteristics of the toners of Examples 1 to 8 and Comparative examples 1 to 5 were examined. The details are as follows. The evaluation results are shown in Table 2.

(1) Printing Durability

In a printing durability test, a commercially-available, non-magnetic one-component development printer (printing speed: 20 A4 sheets/min) was used. The toner cartridge of the development device was filled with the toner. Then, 5 printing sheets were set in the device.

After being left in a normal temperature and normal humidity (N/N) environment (temperature: 23° C., humidity: 50%) for 24 hours, in the same environment, 15,000 printing sheets were continuously printed at an image density of 5%, A black solid pattern (100% image density) was printed on every five hundredth printing sheet. The image density of the black solid pattern was measured by means of a reflection densitometer (product name: RD918, manufactured by: Macbeth). Then, a white solid pattern (0% image density) was printed. In the middle of the white solid pattern printing, the printer was stopped. A piece of an adhesive tape (product name: Scotch Mending Tape 810-3-18, manufactured by: Sumitomo 3M Limited) was attached to the toner in a non-image area on the photoconductor of the development device after development. Then, the piece of tape was peeled off and attached to a printing sheet. Next, the whiteness degree (B) of the printing sheet having the piece of the adhesive tape attached thereon, was measured by means of a whiteness meter (product name: ND-1, manufactured by: Nippon Denshoku Industries Co., Ltd.) In the same manner, another piece of the adhesive tape was attached on a printing sheet, and the whiteness degree (A) of the sheet was measured. The difference (B–A) between the whiteness degrees was determined as a fog value. In general, the smaller the value, the less the occurrence of fog and the better the image quality.

The number of continuously printed sheets was examined, on which an image quality with an image density of 1.3 or more and a fog value of 3 or less, was maintained. The printing durability required of the toner is that the number of continuously printed sheets is 10,000 or more in this test.

In Table 1, "15000<" indicates that even at the time of printing 15,000 sheets, the image quality with an image density of 1.3 or more and a fog value of 3% or less, was maintained.

(2) Toner Conveyance Amount Stability
(i) Measurement of Early-Stage Toner Conveyance Amount (M/A)

After the first 500 sheets was printed in the printing durability test, a white solid pattern was printed on a printing sheet in an environment at 23° C. and 50%, by means of the printer (printing speed: 40 ppm). Then, white solid pattern printing on a next sheet was stopped in the middle. Thereafter, as for the toner attached on the developing roller, the mass of the suctioned toner and the toner suctioned area were measured by means of a suction-type charge amount measurement device (product name: 210HS-2A, manufactured by: TREK Japan KK).

Based on the mass of the suctioned toner and the toner suctioned area, the early-stage toner conveyance amount (mg/cm$^2$) on the developing roller was calculated from Calculation formulae 1 and 2:

Area (cm$^2$) on Developing Roller= (Radius (cm) of Suction Trace)$^2$× π×Number of Suction Traces        Calculation formula 1:

Toner Conveyance Amount (mg/cm$^2$) on Developing Roller=Mass (mg) of Captured Toner/Area (cm$^2$) on Developing Roller        Calculation formula 2:

(ii) Measurement of Middle-stage and End-stage Toner Conveyance Amounts

The toner conveyance amount, on developing roller after the end of the printing durability test on 6,000 sheets was calculated in the same manner as in (i), and thus-calculated toner conveyance amount was referred to as an middle-stage toner conveyance amount, (mg/cm$^2$). Further, the toner conveyance amount on developing roller after the end of the printing durability test on 12,000 sheets, or the toner conveyance amount on developing roller at a number of printed sheets when fog occurred was calculated in the same manner as in (i), and thus-calculated toner conveyance amount was referred to as an end-stage toner conveyance amount (mg/cm$^2$).

(iii) Calculation of Toner Conveyance Amount Stability

Based on the measurement results in (i) and (ii), the toner conveyance amount stability (middle-stage) and toner conveyance amount, stability (end-stage) were calculated from Calculation formulae 3a and 3b as described below.

Toner Conveyance Amount Stability (Middle-stage)= Middle-stage Toner Conveyance Amount/Early-stage Toner Conveyance Amount        Calculation formula 3a:

Toner Conveyance Amount Stability (End-stage)= End-stage Toner Conveyance Amount/Early-stage Toner Conveyance Amount        Calculation formula 3b:

The toner conveyance amount stability required of the toner is that in this test, the toner conveyance amount stability (middle-stage) is 2.0 or less, and the toner conveyance amount stability (end-stage) is 2.5 or less.

(3) Fog in H/H Environment

The non-magnetic one-component development printer that was used in the above printing durability test, was used. The toner to be evaluated was incubated for one day in a high temperature and high humidity (H/H) environment with a temperature of 35° C. and a humidity of 80%. Then, in the same manner as in the above printing durability test, a white solid pattern was printed on the first sheet, and fog in the H/H environment was measured.

The fog characteristics required of the toner in a high temperature and high humidity environment, is that the fog value is 2.0 or less in this test.

The evaluation results of the toners of Examples 1 to 8 and Comparative Examples 1 to 5 are shown in Table 2, along with the type of the external additives. In Table 2, the term "Particles c" means the above-described zinc stearate particles c.

TABLE 2-A1

| External additive | | Example 1 | Example 2 | Example 3 | Example 4 | Example 5 | Example 6 | Example 7 |
|---|---|---|---|---|---|---|---|---|
| External additive A | Type | Fine silica particles 1 | Fine silica particles 2 | Fine silica particles 3 | Fine silica particles 4 | Fine silica particles 5 | Fine silica particles 6 | Fine silica particles 1 |
| | Number average primary particle diameter (nm) | 100 | 100 | 100 | 100 | 100 | 100 | 100 |
| | Hydrophobicity deteremined before the high-temperature and high humidity incubation (%) | 48 | 52 | 49 | 55 | 46 | 48 | 48 |

TABLE 2-A1-continued

|  |  | | | | | | | |
|---|---|---|---|---|---|---|---|---|
|  | Hydrophobicity deteremined before the high-temperature and high humidity incubation (%) | 35 | 43 | 27 | 48 | 17 | 35 | 35 |
|  | Variation in hydrophobicity (%) | 13 | 9 | 22 | 7 | 29 | 13 | 13 |
|  | Added amount (part) | 1.5 | 1.5 | 1.5 | 1.5 | 1.5 | 0.6 | 2.5 |
| External additive B | Type | Fine silica particles b | Fine silica particles b | Fine silica particles b | Fine silica particles b | Fine silica particles b | Fine silica particles b | Fine silica particles b |
|  | Number average primary particle diameter (nm) | 20 | 20 | 20 | 20 | 20 | 20 | 20 |
|  | Added amount (part) | 0.7 | 0.7 | 0.7 | 0.7 | 0.7 | 0.7 | 0.7 |
| External additive C | Type | Particles c | Particles c | Particles c | Particles c | Particles c | Particles c | Particles c |
|  | Number average primary particles diameter (nm) | 500 | 500 | 500 | 500 | 500 | 500 | 500 |
|  | Added amount | 0.1 | 0.1 | 0.1 | 0.1 | 0.1 | 0.1 | 0.1 |
|  | Total added amount of external additive(s) (part) | 2.3 | 2.3 | 2.3 | 2.3 | 2.3 | 1.4 | 3.3 |
| Fixability | Minimum fixing temperature (° C.) | 145 | 145 | 145 | 145 | 145 | 135 | 150 |
| Shelf stability | Blocking amount (g) | 0.1 | 0.1 | 0.1 | 0.1 | 0.1 | 0.1 | 0.1 |
| Printing durability | Number of printed sheets (sheets) | 15000< | 15000< | 15000< | 15000< | 15000< | 12000 | 15000< |
| Toner conveyance amount stability | Middle-stage | 1.15 | 1.21 | 1.12 | 1.45 | 1.14 | 1.50 | 1.08 |
|  | End-stage | 1.55 | 1.77 | 1.42 | 2.28 | 1.35 | 2.15 | 1.32 |
| Fog | HH fog | 0.8 | 0.6 | 1.4 | 0.5 | 2.0 | 1.1 | 1.9 |

| External additive |  | Example 8 | Comparative Example 1 | Comparative Example 2 | Comparative Example 3 | Comparative Example 4 | Comparative Example 5 |
|---|---|---|---|---|---|---|---|
| External additive A | Type | Fine silica particles 1 | Fine silica particles 6 | Fine silica particles 7 | Fine silica particles 8 | Fine silica particles 1 | Fine silica particles 1 |
|  | Number average primary particle diameter (nm) | 100 | 100 | 100 | 50 | 100 | 100 |
|  | Hydrophobicity deteremined before the high-temperature and high humidity incubation (%) | 48 | 51 | 44 | 67 | 48 | 48 |
|  | Hydrophobicity deteremined before the high-temperature and high humidity incubation (%) | 35 | 51 | 10 | 66 | 35 | 35 |
|  | Variation in hydrophobicity (%) | 13 | 0 | 34 | 1 | 13 | 13 |
|  | Added amount (part) | 1.5 | 1.5 | 1.5 | 1.5 | 4.0 | 0.3 |
| External additive B | Type | Fine silica particles b | Fine silica particles b | Fine silica particles b | Fine silica particles b | Fine silica particles b | Fine silica particles b |
|  | Number average primary particl ediameter (nm) | 20 | 20 | 20 | 20 | 20 | 20 |
|  | Added amount (part) | 0.7 | 0.7 | 0.7 | 0.7 | 0.7 | 0.7 |
| External additive C | Type | — | Particles c | Particles c | Particles c | Particles c | Particles c |
|  | Number average primary particles diameter (nm) | — | 500 | 500 | 500 | 500 | 500 |
|  | Added amount | — | 0.1 | 0.1 | 0.1 | 0.1 | 0.1 |
|  | Total added amount of external additive(s) (part) | 2.2 | 2.3 | 2.3 | 2.3 | 4.8 | 1.1 |
| Fixability | Minimum fixing temperature (° C.) | 140 | 145 | 145 | 150 | 160 | 130 |
| Shelf stability | Blocking amount (g) | 0.1 | 0.2 | 0.1 | 0.1 | 0.2 | 10.2 |
| Printing durability | Number of printed sheets (sheets) | 14000 | 10000 | 15000< | 8000 | 11000 | 7000 |
| Toner conveyance amount stability | Middle-stage | 1.10 | 2.12 | 1.08 | 2.32 | 1.25 | 2.02 |
|  | End-stage | 1.48 | — | 1.22 | — | — | — |
| Fog | HH fog | 1.5 | 0.3 | 4.1 | 0.2 | 6.9 | 2.9 |

6. Evaluation of Toner

Hereinafter, the evaluation results of the toners will be examined with reference to Table 2.

According to Table 2, the fine silica particles 6 used for the toner of Comparative Example 1 have a hydrophobicity of 51% that was determined after the high-temperature and high-humidity incubation, and the added amount of the fine silica particles 6 is 1.5 parts by mass.

According to Table 2, the toner of Comparative example 1 has a minimum fixing temperature of 145° C., an average mass of the aggregated toner of 0.2 g, and an HH fog value of 0.3. Therefore, there is no problem with at least low-temperature fixability, heat-resistant shelf stability, and fog in a high temperature and high humidity (H/H) environment.

However, for the toner of Comparative Example 1, the number of sheets successfully printed for the evaluation of the printing durability is as small as 10,000 sheets, and the value of the toner conveyance amount stability (middle-stage) is as high as 2.12. Also for the toner of Comparative Example 1, the toner conveyance amount stability (end-stage) was not evaluated because the toner conveyance amount stability (middle-stage) was poor. The above-described results demonstrate that when the hydrophobicity determined after the high-temperature and high-humidity incubation of the fine silica particles is too high, the toner conveyance amount stability is not excellent and, as a result, the printing durability is poor.

According to Table 2, the fine silica particles 8 used for the toner of Comparative Example 3 have a hydrophobicity of 66% that was determined after the high-temperature and high-humidity incubation, and the added amount of the fine silica particles 8 is 1.5 parts by mass.

According to Table 2, the toner of Comparative example 3 has a minimum fixing temperature of 150° C., an average mass of the aggregated toner of 0.1 g, and an HH fog value of 0.2. Therefore, there is no problem with at least low-temperature fixability, heat-resistant shelf stability, and fog in a high temperature and high humidity (H/H) environment.

However, for the toner of Comparative Example 3, the number of sheets successfully printed for the evaluation of the printing durability is as small as 8,000 sheets, and the value of the toner conveyance amount stability (middle-stage) is as high as 2.32. Also for the toner of Comparative Example 3, the toner conveyance amount stability (end-stage) was not evaluated because the toner conveyance amount stability (middle-stage) was poor. The above-described results demonstrate that when the hydrophobicity determined after the high-temperature and high-humidity incubation of the fine silica particles is even higher than Comparative Example 1, the printing durability and the toner conveyance amount stability are further deteriorated.

According to Table 2, the fine silica particles 7 used for the toner of Comparative Example 2 have a hydrophobicity of 10% that was determined after the high-temperature and high-humidity incubation, and the added amount of the fine silica particles 7 is 1.5 parts by mass.

According to Table 2, the toner of Comparative Example 2 has a minimum fixing temperature of 145° C., an average mass of aggregated toner of 0.1 g, a number of sheets successfully printed for the evaluation of the printing durability of more than 15,000 sheets, a value of the toner conveyance amount stability (middle-stage) of 1.08, and a value of the toner conveyance amount stability (end-stage) of 1.22. Therefore, there is no problem with at least low-temperature fixability, heat-resistant shelf stability, printing durability and toner conveyance amount stability.

However, the HH fog value of the toner of Comparative Example 2 is as high as 4.1. This is considered to be because since the hydrophobicity determined after the high-temperature and high-humidity incubation of the fine silica particles 7 is too low, the amount of adsorbed moisture in the high temperature and high humidity (H/H) environment increased over time and, as a result, fog occurred.

According to Table 2, the fine silica particles 1 used for the toner of Comparative Example 4 have a hydrophobicity of 35% that was determined after the high-temperature and high-humidity incubation, and the added amount of the fine silica particles I is 4.0 parts by mass.

According to Table 2, the toner of Comparative Example 4 has an average mass of the aggregated toner of 0.2 g, and a value of the toner conveyance amount stability (middle-stage) of 1.25. Therefore, as for the toner of Comparative Example 4, there is no problem with at least heat-resistant shelf stability and toner conveyance amount stability (middle-stage).

However, for the toner of Comparative Example 4, the minimum, fixing temperature is as high as 160° C.; the number of sheets successfully printed for the evaluation of the printing durability is as small as 11,000 sheets; and the HH fog value is as high as 6.9. The minimum fixing temperature and the HH fog value are the highest among the examined toners. Also for the toner of Comparative Example 4, the toner conveyance amount stability (end-stage) was not evaluated, because the toner conveyance amount rapidly increased and made the continuous printing difficult at the time when 10.000 sheets were printed. The above-described results demonstrate that when the added amount of the fine silica particles is more than 3.0 parts by mass, a deterioration in low-temperature fixability occurs. The above-described results also demonstrate that when the added amount of external additive is too large, destabilization of the toner conveyance amount and a decrease in charge amount are caused, which lead to a deterioration in toner conveyance amount stability and the occurrence of fog in a high temperature and high humidity (H/H) environment.

According to Table 2, the fine silica particles 1 used for the toner of Comparative Example 5 have a hydrophobicity of 35% that was determined after the high-temperature and high-humidity incubation, and the added amount of the fine silica particles I is 0.3 part by mass.

According to Table 2, the toner of Comparative Example 5 has a minimum fixing temperature of 130° C. Therefore, there is no problem with at least low-temperature fixability.

However, for the toner of Comparative Example 5, the average mass of the aggregated toner is as large as 10.2 g; the number of sheets successfully printed for the evaluation of the printing durability is as small as 7,000 sheets; the value of the toner conveyance amount stability (middle-stage) is as high as 2.02; and the HH fog value is as high as 2.9. The average mass of the aggregated toner of Comparative Example 5 is the largest among the examined toners. The number of sheets successfully printed for the evaluation of the printing durability of the toner of Comparative Example 5, is the smallest among the examined toners. Also for the toner of Comparative Example 5, the toner conveyance amount stability (end-stage) was not evaluated because the toner conveyance amount stability (middle-stage) was poor. The above-described results demonstrate that when the added amount of the fine silica particles is less than 0.5 part by mass, a deterioration in heat-resistant shelf stability and poor printing durability are obtained. The above-described results also demonstrate that when the added amount of the external additive is too small, destabilization of toner conveyance amount and a decrease in charge amount are caused, which lead to a deterioration in toner conveyance amount stability and the occurrence of fog in a high temperature and high humidity (H/H) environment.

On the other hand, according to Table 2, the fine silica particles 1 to 5 used for the toners of Examples 1 to 8 have hydrophobicities of 17 to 48% that were determined after the high-temperature and high-humidity incubation, and the added amounts of these fine silica particles are 0.6 to 2.5 parts by mass.

According to Table 2, as for the toners of Examples 1 to 8, the minimum fixing temperature is as low as 150° C. or less; the average mass of the aggregated toner is as small as 2.5 g or less; the number of sheets successfully printed for the evaluation of the printing durability of the toner is 12,000 sheets or more; the value of the toner conveyance amount stability (middle-stage) is as low as 1.50 or less; the value of the toner conveyance amount stability (end-stage) is as low as 2.28 or less; and the HH fog value is as low as 2.0 or less.

Therefore, it is clear that the toner of the present invention comprising, as the external additive, fine silica particles in an amount of 0.5 to 3.0 parts by mass, the fine silica particles having a hydrophobicity of 15 to 49% that is determined after the high-temperature and high-humidity incubation, is a toner which has an excellent balance between low-temperature fixability and heat-resistant shelf stability, which has good toner conveyance amount stability and printing durability, and which has less occurrence of fog in a high temperature and high humidity environment. Also, it is clear that especially in the case where the variation in hydrophobicity is in the range of 5 to 28%, the occurrence of fog is effectively inhibited in the high temperature and high humidity environment.

The invention claimed is:

1. A toner for developing electrostatic images, comprising colored resin particles containing a binder resin and a colorant, and an external additive,
   wherein the toner comprises, as the external additive, fine silica particles in an amount of 0.5 to 2.0 parts by mass with respect to 100 parts by mass of the colored resin particles, the fine silica particles having been subjected to a hydrophobicity-imparting treatment with a silicon compound, and the fine silica particles having a hydrophobicity of 27 to 49% that is determined after a high-temperature and high-humidity incubation;
   wherein the fine silica particles have a number average primary particle diameter of 50 to 500 nm; and
   wherein the toner comprises, as the external additive, fatty acid metal salt particles having a number average primary particle diameter of 100 to 500 nm.

2. The toner for developing electrostatic images according to claim 1, wherein a variation in hydrophobicity of the fine silica particles is 5 to 28% between a hydrophobicity determined before a high-temperature and high-humidity incubation and that determined after the high-temperature and high-humidity incubation.

3. The toner for developing electrostatic images according to claim 1, wherein a total content of the external additive is 1.40 to 4.00 parts by mass with respect to 100 parts by mass of the colored resin particles.

4. The toner for developing electrostatic images according to claim 1,
   wherein the colored resin particles are positively chargeable, and
   wherein the fine silica particles are surface-treated to be positively chargeable.

* * * * *